(12) United States Patent
Kano

(10) Patent No.: US 7,096,325 B2
(45) Date of Patent: Aug. 22, 2006

(54) METHOD AND APPARATUS FOR MULTISTAGE VOLUME LOCKING

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 183 days.

(21) Appl. No.: 10/812,537

(22) Filed: Mar. 29, 2004

(65) Prior Publication Data

US 2005/0216661 A1 Sep. 29, 2005

(51) Int. Cl.
*G06F 12/14* (2006.01)
(52) U.S. Cl. ..................................... 711/152
(58) Field of Classification Search ............... 711/114, 711/152, 163
See application file for complete search history.

(56) References Cited

U.S. PATENT DOCUMENTS

| 5,408,629 | A | * | 4/1995 | Tsuchiya et al. ............ 711/151 |
| 5,551,046 | A | | 8/1996 | Mohan et al. |
| 5,678,026 | A | * | 10/1997 | Vartti et al. ................. 711/152 |
| 5,832,484 | A | | 11/1998 | Sankaran et al. |
| 5,933,824 | A | | 8/1999 | DeKoning et al. |
| 6,151,659 | A | | 11/2000 | Solomon et al. |
| 6,268,850 | B1 | | 7/2001 | Ng |
| 6,499,058 | B1 | | 12/2002 | Hozumi |
| 6,629,264 | B1 | * | 9/2003 | Sicola et al. .................. 714/15 |
| 2003/0182285 | A1 | | 9/2003 | Kuwata et al. |
| 2003/0187860 | A1 | | 10/2003 | Holland |
| 2004/0226021 | A1 | * | 11/2004 | Miki et al. .................. 719/313 |

FOREIGN PATENT DOCUMENTS

JP 2000-148714 A 5/2000

OTHER PUBLICATIONS

"Cisco MDS 9000 Family of Multilayer Directors and Fabric Switches," product information Cisco Systems, Inc. San Jose, CA (1992-2003).
"The High Performance, SAN Alliance: SAN, SSD, and Virtualization," a White Paper from Imperial Technology El Segundo, CA and FalconStor Software, Inc. Melville, NY (2002).
"The Value of Storage Virtualization," a White Paper from FalconStor Software, Inc. Melville, NY (2001-2003).

* cited by examiner

*Primary Examiner*—Kevin L. Ellis
(74) *Attorney, Agent, or Firm*—Townsend and Townsend and Crew LLP

(57) ABSTRACT

A storage subsystem includes a controller having a plurality of ports and a plurality of storage devices configured store information. A lock table includes attribute information and retention information for each of a plurality of storage volumes presented to a host device. The plurality of storage volumes includes a non-virtual volume that maps to a first storage device of the storage subsystem and a virtual volume that maps to a second storage device of an associated storage subsystem. The associated subsystem is linked to the storage subsystem via a communication link. The controller is configured to receive and process a request from a host to modify an attribute of the virtual volume.

20 Claims, 10 Drawing Sheets

FIG. 3A

| Port | WWN | LUN |
|---|---|---|
| 1 | 10.00.00.00.C9.36.07.D7 | 1 |
| 1 | 10.00.00.00.C9.36.07.D7 | 2 |
| 1 | 10.00.00.00.C9.36.07.D7 | 3 |
| ... | ... | ... |
| 2 | 10.00.00.00.C9.36.07.01 | 1 |
| 2 | 10.00.00.00.C9.36.07.01 | 2 |
| 2 | 10.00.00.00.C9.36.07.01 | 3 |
| ... | ... | ... |
| 1 | XX.XX.XX.XX.XX.XX.XX.XX | J |
| ... | ... | ... |

FIG. 3B

| Internal LUN | WWN for Storage Subsystem | External LUN |
|---|---|---|
| 1 | - | - |
| 2 | - | - |
| N | - | - |
| ... | ... | ... |
| M | 10.00.00.00.C9.36.07.AD | 0 |
| M+1 | 10.00.00.00.C9.36.07.AD | 1 |
| N | 10.00.00.00.C9.36.07.AD | 2 |
| ... | ... | ... |
| L | 10.00.00.00.C9.36.07.EC | Q |
| ... | ... | ... |

|  | 41 | 42 | 43 |
|---|---|---|---|
|  | Internal LUN | Permission | Remain retention time |
| 45 | 1 | Read-only | 6 year |
| 47 | 2 | Read-only | Forever |
|  | N | Read/Write | - |
|  | ... | .... | ... |
|  | M | - | - |
|  | M+1 | - | - |
|  | N | - | - |
|  | ... | ... | ... |
|  | L | - | - |
|  |  |  |  |

| 171 | 172 | 173 |
|---|---|---|
| Port | WWN | LUN |
| 0 | 10.00.00.00.C9.36.07.AD | 0 |
| 0 | 10.00.00.00.C9.36.07.AD | 1 |
| 0 | 10.00.00.00.C9.36.07.AD | 2 |
|  | ... |  |
| 1 | 10.00.00.00.C9.36.07.EC | Q |
| .. | ... | ... |

| Internal LUN (181) | permission (182) | Remain retention time (183) |
|---|---|---|
| 0 | Read-only | 6 year |
| 1 | Read-only | 6 year |
| 2 | Read-only | forever |
| ... | | ... |
| q | Read-Write | - |

| LUN (176) | Internal LUN (177) |
|---|---|
| 0 | 0 |
| 1 | 1 |
| 2 | 2 |
| | ... |
| Q | q |
| ... | ... |

175

METHOD AND APPARATUS FOR MULTISTAGE VOLUME LOCKING

BACKGROUND OF THE INVENTION

The present invention relates to management of a storage system having a plurality of storage volumes.

Data is the underlying resources on which all computing processes are based. With the recent explosive growth of the Internet and e-business, the demand on data storage systems has increased tremendously. There are many types of storage devices, e.g., semiconductor devices, magnetic disk, and magnetic tapes, that may be used to store data. Each of these types of storage devices have different access speeds and costs associated thereto. The semiconductor devices are generally the fastest and also the most expensive. Accordingly, they are not commonly used in data centers where massive amounts of data need to be stored.

Generally, magnetic disks and tapes are the storage devices of choice for the data centers since they tend to be considerably cheaper than the semiconductor devices. The storage system for a data center generally has multiple processors and includes sophisticated operating systems for quickly reading and writing massive amounts of data.

Data centers or storage systems commonly includes a plurality of storage units or subsystems. Some are configured to be primary storage devices, and others are configured to be secondary storage devices. The primary storage devices are designed to store active data that users may access, whereas the secondary storage devices serves as back-up devices to be used in case the primary storage devices experience failure. The secondary devices are also used to store or archive "inactive" or "stale" data that the primary device does not need, so that the storage capacity of the primary devices may be freed-up for new data. The primary storage device is located at a primary site, and the secondary storage device is located at a secondary site that may be dozens, hundreds, or even thousands of miles apart from the primary site.

These data centers are linked using Storage Area Networks (SANs). The SAN is a back-end network that is used to link a plurality of storage subsystems to each other and to link a plurality of hosts to these storage subsystems. The SAN enables makes sharing of storage capacities of the subsystems easy since a host computer may access a multiple storage devices or subsystems by simply connecting the host to a SAN rather than directly connecting the host to each of these multiple storage devices.

While the intended purpose of the SAN is to provide simplified storage solutions, the implementation and maintenance of a SAN solution may become quite complicated. The administrative overhead associated with the SAN and storage subsystems attached thereto can be quite high as the SAN configuration becomes more and more complicated. One solution to this administrative headache is to provide storage virtualization.

Storage virtualization is a layer of abstraction that separates the representation of storage from physical storage devices. In a typical configuration, a multiple physical storage devices is aggregated into a single virtual storage pool. The storage volumes associated with the virtual pool are made appear as locally attached logical devices to the host even though the logical devices are indirectly linked to the host via a virtualized storage subsystem. Accordingly, the virtualization enables the IT administrators the freedom to provision the available storage volumes in the virtual pool as SAN or NAS volumes, or both.

One problem associated with storage virtualization is that a storage subsystem (or virtualized storage subsystem) which uses storage resources or volumes of another storage subsystem cannot control the attributes of such storage resources. The attributes control the access policy of logical units or volumes.

BRIEF SUMMARY OF THE INVENTION

The present invention relates to a storage system that provides a virtual storage volume. One embodiment relates to managing a virtualized storage subsystem, in such a way that the attributes of both virtual and internal volumes may be managed on the virtualized storage subsystem. The virtualized storage system manages the attribute, e.g., read-only or read/write access, for a virtual volume (VLUN) when a Storage API on a host calls to the virtualized storage subsystem.

In one embodiment, after the completion of read/write operations for a target volume, an application on a host calls a Storage API function to change the attribute of a used volume. The attribute may be an access policy or the retention time. The Storage API sends a request for status modification to the virtualized storage subsystem. The virtualized storage subsystem sends a request for attribute modification to an associated storage system wherein the virtual volume is actually defined. The associated storage subsystem modifies, saves, and executes the attribute. The associated storage subsystem then returns the result to the Storage API of the host via the virtualized storage subsystem.

In one embodiment, a storage subsystem includes a controller having a plurality of ports and a plurality of storage devices configured store information. A lock table includes attribute information and retention information for each of a plurality of storage volumes presented to a host device. The plurality of storage volumes includes a non-virtual volume that maps to a first storage device of the storage subsystem and a virtual volume that maps to a second storage device of an associated storage subsystem. The associated subsystem is linked to the storage subsystem via a communication link. The controller is configured to receive and process a request from a host to modify an attribute of the virtual volume.

In another embodiment, a method for managing a storage system includes presenting a plurality of storage volumes to a host via a first storage subsystem, the plurality of storage volumes including a non-virtual volume that maps to a storage area within the first storage subsystem and a virtual volume that maps to a storage area within a second storage subsystem that is different from the first subsystem; receiving at the first subsystem a first request from a host to modify an attribute of a target storage volume, the target storage volume being one of the plurality of storage volumes presented to the host; and sending a second request from the first subsystem to the second subsystem if the target volume is determined to be the virtual volume, the second request being a request to modify the attribute of the target volume.

In yet another embodiment, a computer readable medium includes a computer program for managing a storage subsystem. The computer program comprises code for presenting a plurality of storage volumes to a host via a first storage subsystem, the plurality of storage volumes including a non-virtual volume that maps to a storage area within the first storage subsystem and a virtual volume that maps to a storage area within a second storage subsystem that is different from the first subsystem; code for receiving at the first subsystem a first request from a host to modify an attribute of a target storage volume, the target storage volume being one of the plurality of storage volumes presented to the host; and code for sending a second request from the first subsystem to the second subsystem if the target volume is determined to be the virtual volume, the second request being a request to modify the attribute of the target volume.

As used herein, the term "virtualized storage subsystem" refers to a storage system that presents at least one virtual storage volume to a host. The virtualized storage subsystem, accordingly, may include only virtual volumes or both virtual and non-virtual volumes.

As used herein, the term "non-virtual volume" refers to an internal volume that is defined by one or more storage devices of the virtualized storage subsystem. That is, the non-virtual volume is not located not externally located from the virtual storage subsystem.

As used herein, the term "virtual storage volume" or "virtual volume" or "virtual LU" refers to a storage volume that is presented to a host via the virtual storage subsystem even thought the storage volume is not located the virtual storage subsystem. That is, the storage volume is located in a different storage subsystem than the virtual storage subsystem.

As used herein, the term "external storage subsystem" or "external subsystem" or "associated storage subsystem" or "associated subsystem" refers to a storage subsystem that provides a virtual storage volume to the virtual storage subsystem.

As used herein, the term "storage system" refers to a computer system configured to store data and includes one or more storage units or storage subsystems, e.g., disk array units. Accordingly, the storage system may refer to a computer system including one or more hosts and one or more storage subsystems, or only a storage subsystem or unit, or a plurality of storage subsystems or units coupled to a plurality of hosts via a communication link.

As used herein, the term "storage subsystem" refers to a computer system that is configured to storage data and includes a storage area and a storage controller for handing requests from one or more hosts. The storage subsystem may be referred to as a storage device, storage unit, storage apparatus, or the like. An example of the storage subsystem is a disk array unit.

As used herein, the term "host" refers to a computer system that is coupled to one or more storage systems or storage subsystems and is configured to send requests to the storage systems or storage subsystems. The host may perform the functions of a server or client.

BRIEF DESCRIPTION OF THE DRAWINGS

FIG. 3A illustrates the port map table according to one embodiment of the present invention.

FIG. 3B illustrates the internal map table according to one embodiment of the present invention.

FIG. 3C illustrates the lock table according to one embodiment of the present invention.

FIG. 4A illustrates a port map table 170 including a port field, a WWN field, and a LUN field according to one embodiment of the present invention.

FIG. 4B illustrates a lock table 180 including a I-LU field, a permission field, and a retention field according to one embodiment of the present invention.

FIG. 4C illustrates an internal map table including a LUN field which indicates the identification information used within the associated subsystem and an I-LU field indicates the identification information used by the host according to one embodiment of the present invention.

DETAILED DESCRIPTION OF THE INVENTION

Figure 1:
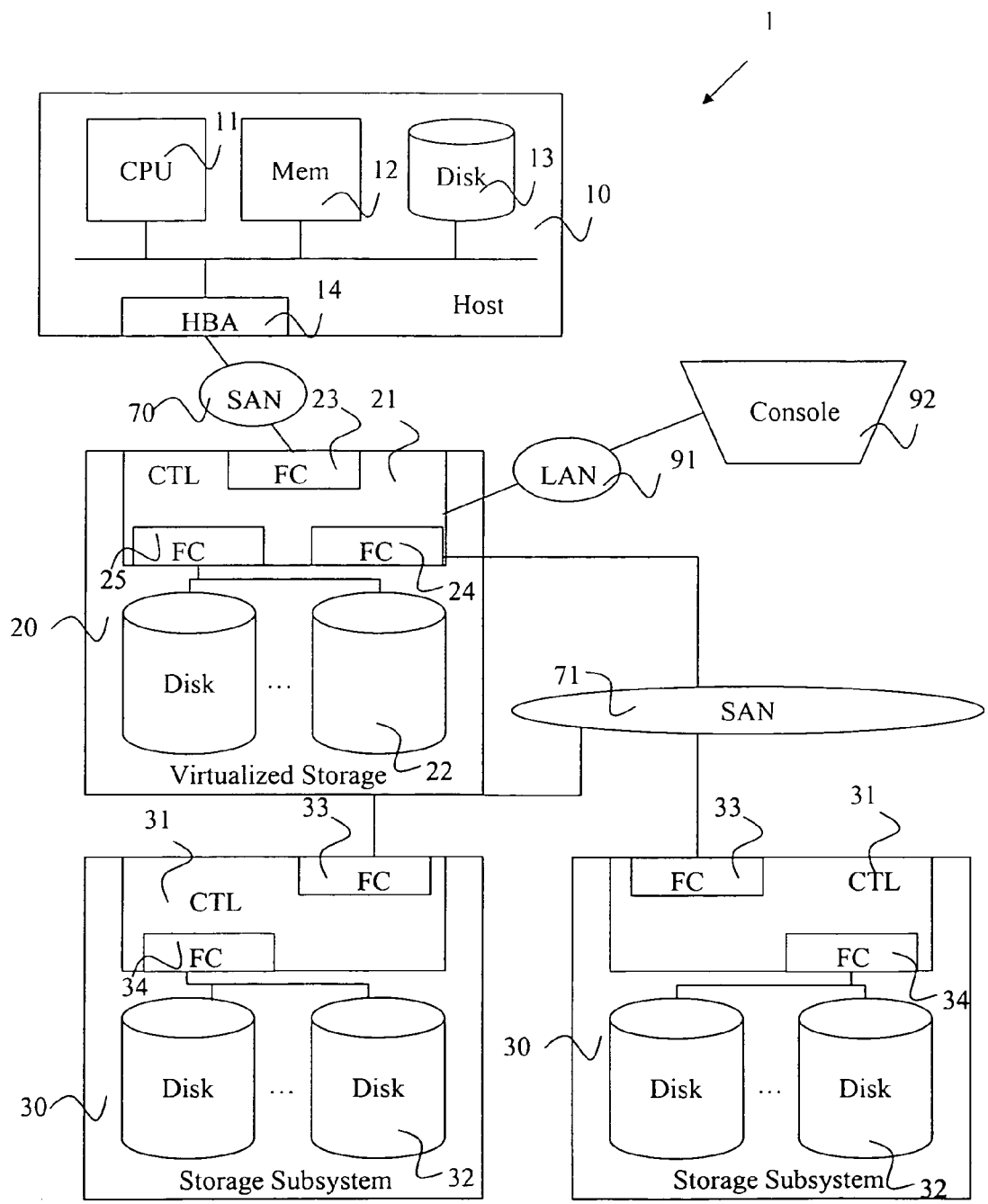
FIG. 1 is a diagram illustrating a storage system having a virtualized storage subsystem according to one embodiment of the present invention.
Figure 2:
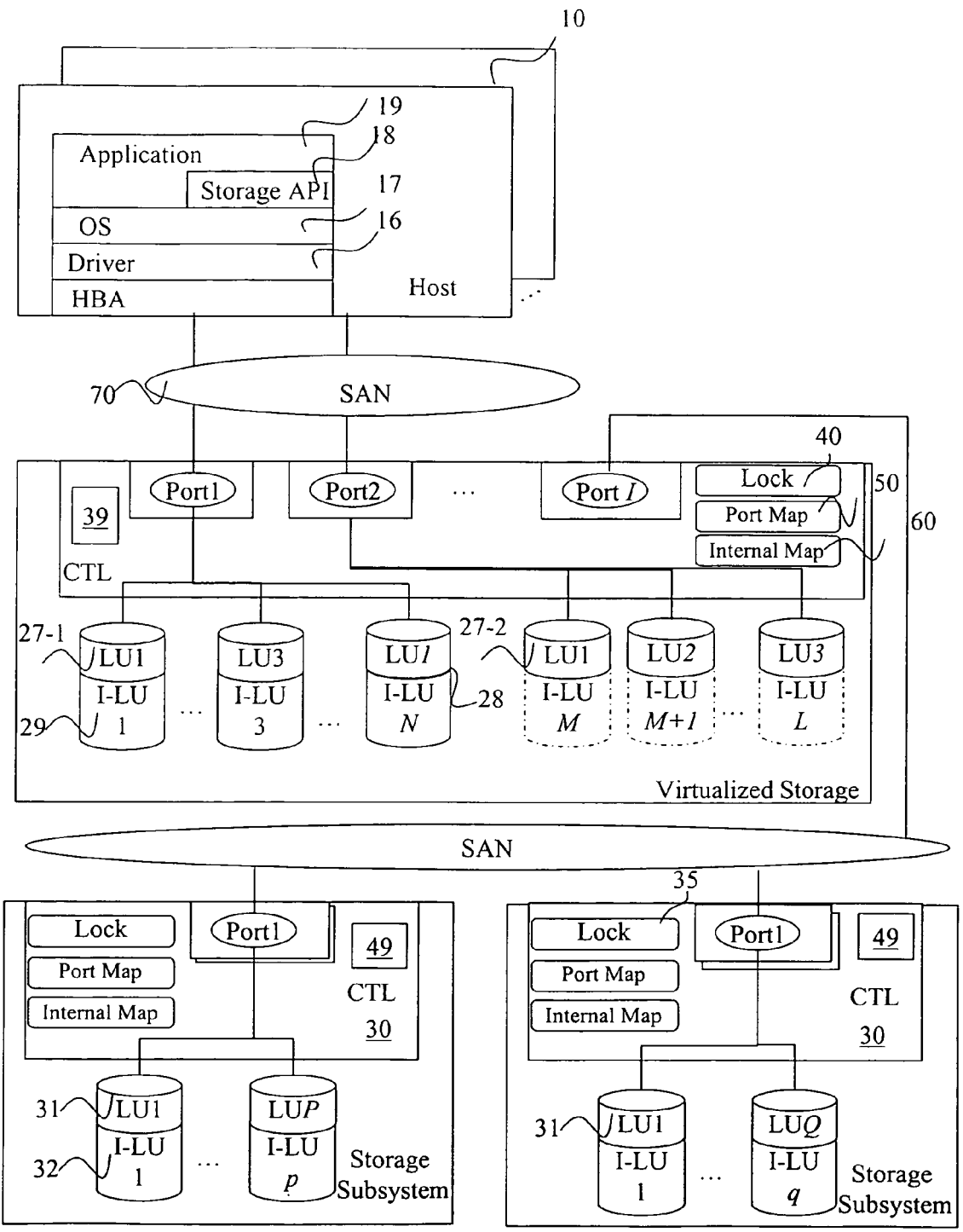
FIG. 2 illustrates the logical configuration and software of the storage system according to one embodiment of the present invention.

FIGS. 1 and 2 are diagrams illustrating a storage system 1 having a virtualized storage subsystem 20 according to one embodiment of the present invention. FIG. 1 illustrates hardware components of the storage system and interconnections thereof. FIG. 2 illustrates a logical configuration of the storage system. The storage system includes a host 10, a virtualized storage subsystem (VSS) 20, one or more associated storage subsystems 30, a management console 92. The host is coupled to the VSS 20 via a Storage Area Network (SAN) 70. The VSS and associated subsystems are coupled via a SAN 71. The SANs 70 and 71 may or may not be the same network. A Local Area Network (LAN) 91 couples the console and the VSS.

In one embodiment, the host, VSS, and associated subsystems are coupled together using an Ethernet based network, as out-of-band control. In another embodiment, an in-band connection, e.g., SAN 70 or 71, may be used to control the VSS and associated subsystems. In yet other embodiments, other types of network may be used, e.g., SCSI, and iSCSI, token ring, etc.

The host includes a central processing unit 11, a memory 12, a storage area or disk 13, and a host bus adaptor (HBA) 14. The host includes an application 19 operable to generate and process data, a storage API 18 that interfaces between the application and the storage subsystems for writing or reading data according to the commands issued by the application, an operating system 17 that presents a platform to run software programs in the host, a driver 16 that controls the HBA to access block devices, e.g., disks, of the subsystems (see FIG. 2). The host is a general purpose computer or server in one implementation.

Storage API has a capability to control the storage subsystem using SCSI command sets. Because the storage subsystem is the target device, we can't control the storage directly. This technology which controls the storage device using SCSI command sets has been already existed as a part of "EP1246050" from line 0022–004. The storage API fit to RMLIB and command device is equal to CM in the EP124650.

The VSS 20 is configured to store data in storage volumes or LUs according to Small Computer System Interface (SCSI) commands in the present embodiment. The VSS includes a storage controller 21 and a plurality of disks 22. The controller includes a plurality of ports 23, 24, and 25 that are used to link the VSS to the host or the associated subsystems.

Each port is provided with a World Wide Name (WWN) which is a unique identifier and is also referred to as a target ID. On each port, up to 256 LUNs may be defined in the present embodiment. The port is equivalent to a physical port in Fibre Channel. The controller may define a plurality of virtual ports from each physical port. The virtual ports that are associated with a given physical port, nevertheless, cannot have more than 256 LUNs in all.

Generally, the controller includes a processor that manages the read and write requests to the disks 22. The controller may also include a non-volatile random access memory (NVRAM) to temporarily store data prior to executing the related requests. The NVRAM is used to ensure that the data is protected from a power failure using battery backup.

The VSS presents a plurality of Internal LUs (I-LUs) to store data and setting information. The I-LUs that store data are referred to as data volumes, and those that store setting information are referred to as setting volumes. The storage volumes may be configured in a variety of known configurations, for example, RAID 0, RAID 5 or other technologies to protect data for hardware failure.

As used herein, the term "data" refers to actual information that is generated or processed by the application 19 on the host. The term "setting information" refers to administrative information that is used to manage the storage, retrieval, etc. of the data. Examples of the setting information are an internal mapping table 60, lock table 70, and port map table 80, which are explained in more detail later.

Each of the associated subsystems 30 includes a controllers 31 having a plurality of ports 33 and 34 and a plurality of disks 32. The port 33 is coupled to the port of the VSS, and the port 34 is coupled to the storage disks within the subsystem.

The console 92 is used to manage the storage subsystems, including the VSS and associated subsystems. The management functions include creation of LUs, defining of attributes for LUs and the like. Although the console is shown as an external server in FIG. 1, the console may be integrated with one of the subsystems, e.g., VSS or associated subsystems.

FIG. 2 illustrates the logical configuration and software of the storage system 1 according to one embodiment of the present invention. The controller 21 of the VSS manages setting information or tables: the lock table 40, port map table 50, and internal map table 60.

FIG. 3A illustrates the port map table 50 according to one embodiment of the present invention. The table includes the mapping information of the LUs and ports that are exported to the host. The port map includes a port field 51 for indicating a given port, a WWN field 52 for indicating a given target ID, a LUN field 53 presents the I-LUs to the host as LU. The host uses this mapping information to identify a storage area to be accessed.

FIG. 3B illustrates the internal map table 60 according to one embodiment of the present invention. The table includes an I-LUN field 61, a WWN field 62, and an external LUN field 63. The table maps the I-LUs to the external logical volumes.

In the present embodiment, I-LUs presented to the host includes LUs that are internal to the VSS (or non-virtual volumes) and well as LUs that are external to the VSS (or virtual volumes). In FIG. 2, LUs 27-1 are internal logical volumes that map to the storage disks or logical devices (LDEVs) of the VSS. LUs 27-2, however, are external logical volumes that map to the storage disks or LDEVs that reside in the associated subsystems 30. Accordingly, the LUs 27-1 are referred to as being located in the VSS, and the LUs 27-2 are located external to the VSS.

Referring back to FIG. 3B, I-LUs 65 that are internal volumes of VSS do not have values in the WWN field 62 and are not mapped to the external LUN since these volumes reside in the VSS. However, I-LUs 67 that are virtual volumes and located in the associated subsystem are mapped to external LUNs.

FIG. 3C illustrates the lock table 40 according to one embodiment of the present invention. The lock map 40 includes an I-LU field 41, a permission field 42, and a retention field 43. If the I-LU is mapped to a storage device or LDEV of an external storage subsystem (associated subsystem), the entries for the fields 42 and 43 are "-" to indicate that the I-LU is a virtual storage volume. The permission and retention information for such a virtual storage volume is maintained by a lock table of the associated subsystem, as explained in more detail later.

As illustrated, the table includes attributes and retention information about the I-LUs. The attributes define how a given LU is to behave. Accordingly, the attribute includes permission information as well as other rules that defines the behavior of the LUs. The retention information provides the length time a given attribute is to be assigned to the LU. In the present embodiment, the attribute assigned to a given LU cannot be changed within the specified retention time period, i.e., while the retention period has not expired.

In the present embodiment, the permission information includes a READ/WRITE mode which indicates that both read and write access are permitted for a given LU, a READ ONLY mode which indicates that only read access is permitted for a given LU, and a ZERO-CAPACITY which indicates that a size-zero to be returned when a SCSI capacity inquiry is received. A LU that has been assigned ZERO-CAPACITY cannot serve as a secondary volume for storing backup data.

Accordingly, an I-LU 1 indicated by numeral 45 is assigned READ ONLY attribute and only permits read access to the host 10 for the specified retention period, i.e., for 6 years. The host cannot write to I-LU 1 during this period. An I-LU 2 indicated by numeral 47, on the other hand, is assigned the READ ONLY attribute forever, so that the data stored therein can never be deleted or modified the host.

Each of the associated subsystems 30 also includes a port map table 170, a lock table 180, and an internal map table 175. These tables correspond to those of the VSS. The port map table 170 includes a port field 171, a WWN field 172, and a LUN field 173 (FIG. 4A). The lock table 180 includes a I-LU field 181, a permission field 182, and a retention field 183 (FIG. 4B). The internal map table 175 includes a LUN field 176 which indicates the identification information used within the associated subsystem and an I-LU field 177 indicates the identification information used by the host (FIG. 4C). Accordingly, the table 175 maps the I-LUs to the LUN of the associated subsystem.

Figure 5:
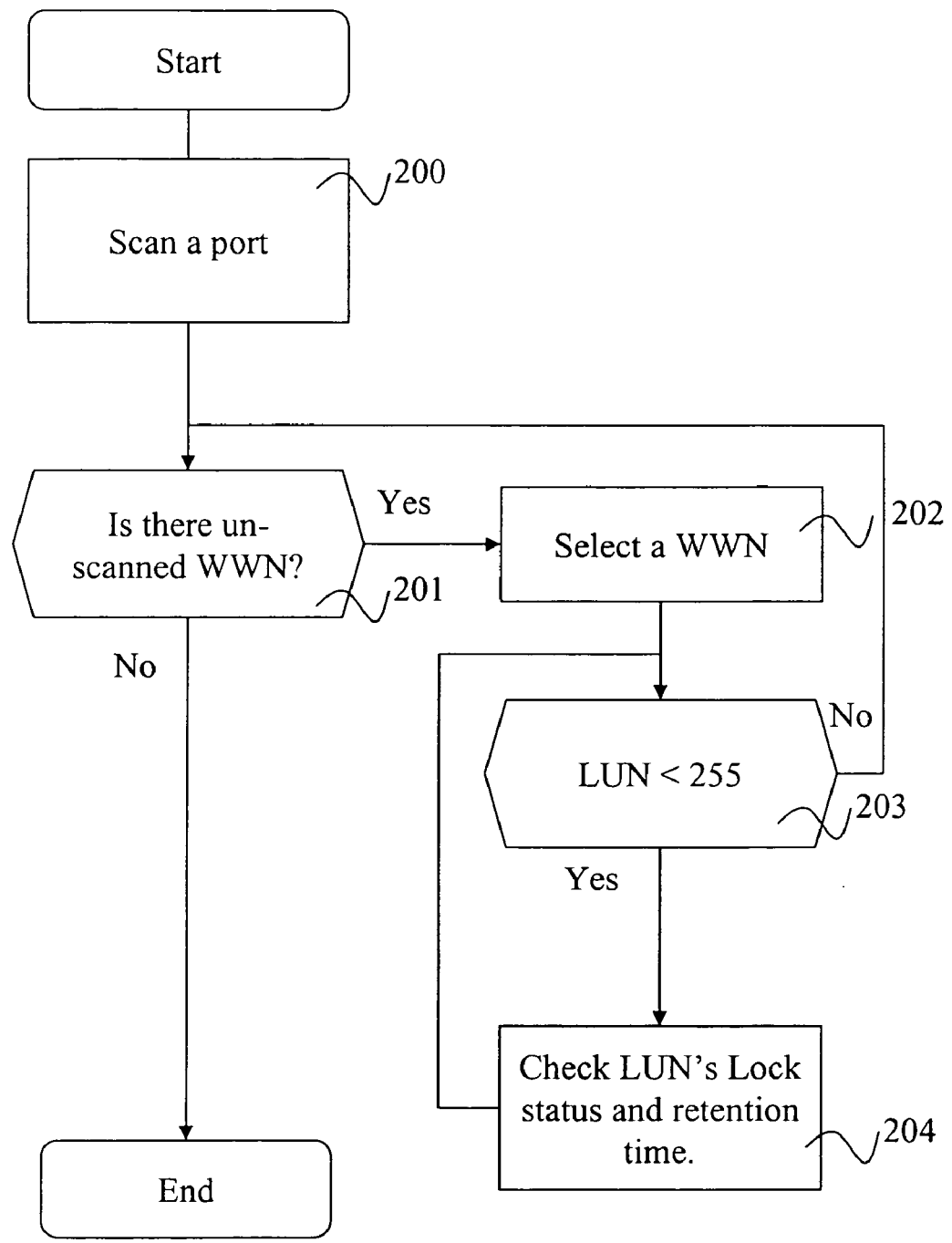
FIG. 5 illustrates a process performed by the VSS to discover new external LUs according to one embodiment of the present invention.

FIG. 5 illustrates a process performed by the VSS to discover new external LUs (virtual storage volumes) according to one embodiment of the present invention. At step 200, the controller 21 on the VSS sends an inquiry to the ports installed in the SAN. Each port has a unique WWN, which is a SCSI target ID. Based on the responses received, the controller 21 determines whether or not there is a new target or port has been installed to the SAN since the last inquiry by comparing the WWNs received with the WWNs in its port table (step 201) If a new target has been installed, the controller selects the new WWN or port (step 202).

The controller investigates the LUNs of the new port (step 203). If the highest LUN is less than the maximum number of LUN (ex. 255 LUN for a port), the process proceeds to the next step. If the highest LUN is not less than 255, the process returns to step 201 since the maximum number of allowed LUN is 256 in the present embodiment. That is, in a current SCSI environment, a physical port cannot have more than 255 LUN. The number for LUN starts at 0. If the virtual port capability is used, a "physical port" has several virtual ports associated with the host's WWN. The storage subsystem may provide more than 512 LUNs on a given "physical" port to group the LUs to virtual ports that are associated with the physical port At step 204, the controller issues a SCSI inquiry to investigate the vender name and serial number for the storage subsystem of the new port. At this time, the status of attribute for LU and the corresponding retention time are checked as well. Thereafter, the internal mapping table 60 is updated to include the new WWN and new LUNs.

Referring back to step 601, if no new WWN has been received, then the controller determines that no new port has been installed to the SAN. The process ends the session and waits to initiate the next session.

In one embodiment, an operator may start to process and/or decide to map a LUN to I-LUN without the use of VSS. For example, the operator uses the console 92 to assign the LUN to I-LUN and present it to the host. The internal mapping table 60 is updated with this information.

The host 10, on the other hand, scans LUs using a SCSI inquiry and assigns a logical volume number and device name to a new LU to commence accessing the LU. In one implementation, the device file for Windows appears as follows: /dev/rdsk/c4t1d0 in Unix or \\.\PhysicalDisk1.

Figure 6:
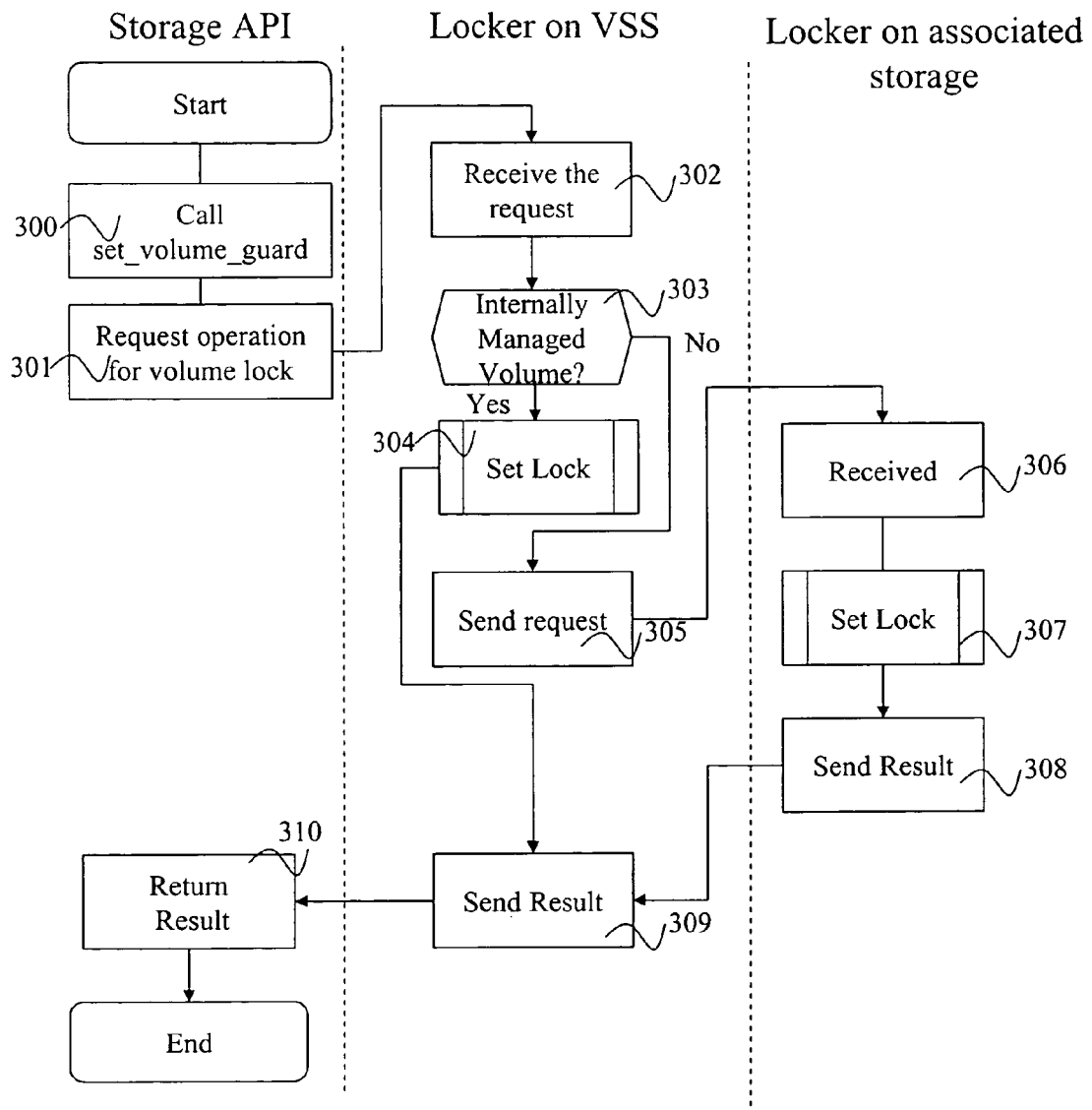
FIG. 6 illustrates a process for managing an attribute of a LU or volume according to one embodiment of the present invention.

FIG. 6 illustrates a process for managing an attribute of a LU or volume according to one embodiment of the present invention. The attributes include setting a LU to be READ ONLY, READ-WRITE, or SIZE-ZERO, or a combination thereof. For example, the LU may be set to be both READ ONLY and SIZE-ZERO.

Initially, data are stored to the LU using SCSI write commands. Once desired data are stored in the LU (or the LU is full), then the application may change the attribute of the LU. The attribute may be changed from READ-WRITE to READ ONLY or SIZE-ZERO in the present embodiment. The attribute is a rule that affects the behavior of the LU. Accordingly, other types of attributes may be assigned to the LU and then modified, if desired. The attribute is changed by calling a storage API as explained below.

At step 300, the application calls a storage API or "set_volume_guard." The target internal LU number, an attribute, retention term for the attribute are provided. The storage API provides at least two I/Fs to manage the attribute.

int set_volume_guard(internal_LU_num, retention, attribute)
    ini unset_volume_guard(internal_LU_num)

The first command or request is to change the attribute of the volume to READ ONLY. That is, the volume is locked. The volume number and the retention period are specified. The second command is the change the attribute of the volume from READ ONLY to READ-WRITE. That is, the volume is unlocked.

At step 101, the storage API requests to a locker module 39 to make the target I-LU READ ONLY. In the present embodiment, the module 39 is part of microcode and is located on VSS's controller 21.

The locker module receives the request via the SAN 70 (step 302). The location of the I-LU is checked using the internal mapping table 60 (step 303). If the location of the I-LU is within the VSS, then the locker module changes the attribute of the I-LU as requested (step 304). The lock table 40 managed by the VSS is updated accordingly. An acknowledgement of this action is sent to the storage API (step 309). The storage API, in turn, notifies the application that the target I-LU has been locked to READ ONLY (step 310).

At step 303, if it is determined that the target I-LU is located in the associated subsystem 30 and not in the VSS, the controller 21 sends a request to the associated subsystem 30 (step 305). A locker module 49 in the controller 31 of the associated subsystem receives the request (step 306) via the SAN 71. The target I-LU is locked as per the request (step 307). The lock table 80 is updated accordingly. An acknowledgement of this action is sent to the VSS (step 308), which forwards it to the storage API (step 309). The storage API informs the application that the target I-LU has been locked to READ ONLY (step 310).

Once the LU has been locked, the host is not permitted to write to the LU. If a write request to the LU is sent by the host, the controller sends an error message to the host. In one implementation, the communication between the storage API and VSS or the VSS and associated subsystem is done over the out-band communication path, e.g., Ethernet. Alternatively, an in-band communication path may be used.

Figure 7:
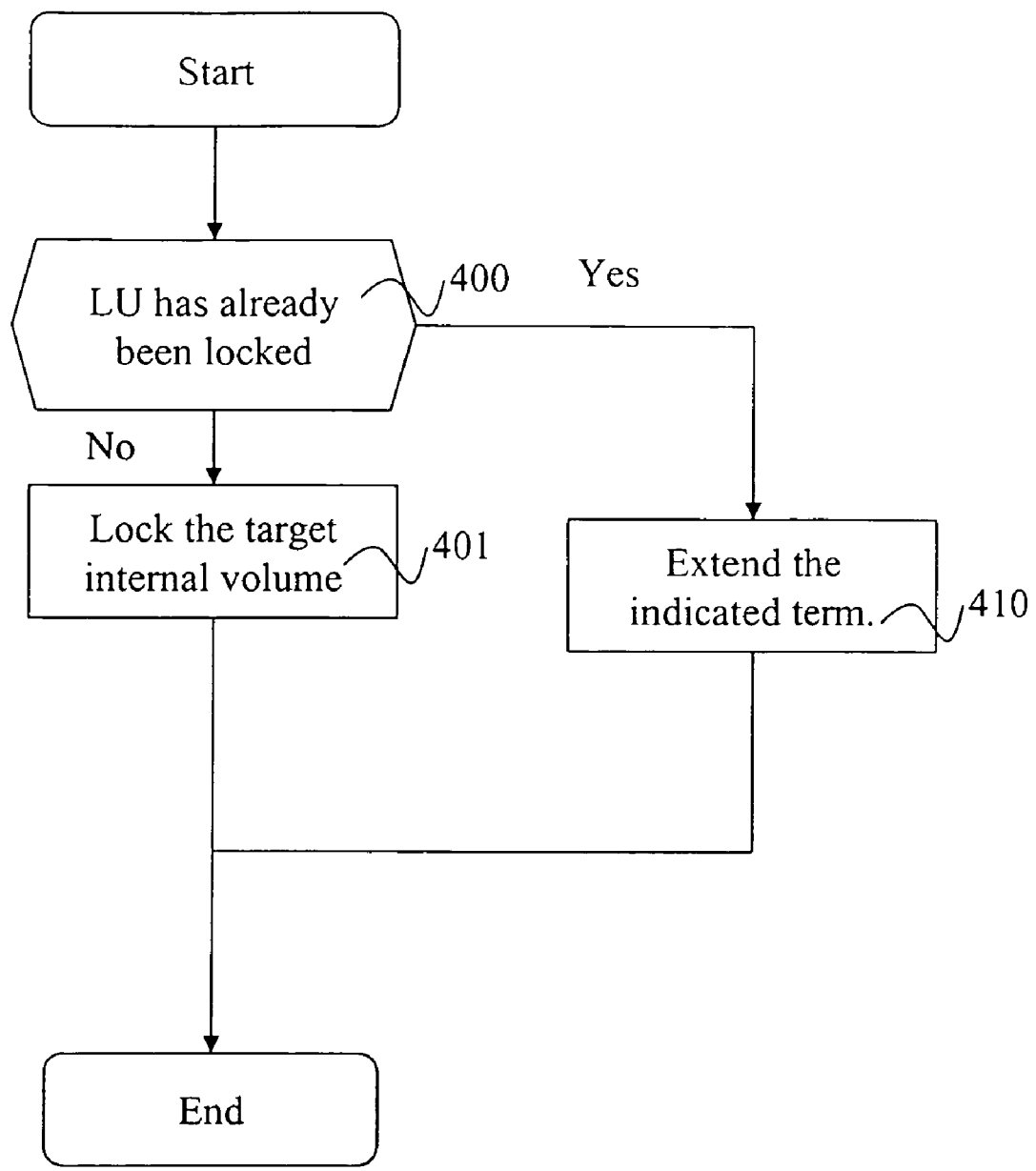
FIG. 7 illustrates a process for managing retention information of a LU according to one embodiment of the present invention.

FIG. 7 illustrates a process for managing retention information of a LU according to one embodiment of the present invention. At step 400, the locker module on the controller determines whether or not the target LU has been assigned an attribute, e.g., whether or not the LU has been locked. If an attribute has been assigned. The locker module modifies the retention information (step 410). The retention field of the lock table is updated.

In the present embodiment, the retention information may be modified only to increase the retention period. That is, the retention period may not be shorten once it has been assigned to the LU. The retention period uses days as a unit so that the period is decremented by 1 each day. Other units of time may be used, e.g., seconds, minutes, hours, months, or years.

Referring back to step 400, if the target LU has not been locked, then the locker module locks the target LU (step 401). The READ ONLY attribute is stored in permission field 42 of the lock table 40 if the LU is located within the VSS or the permission field 82 of the lock table 80 if the LU is located in associated subsystem.

Figure 8:
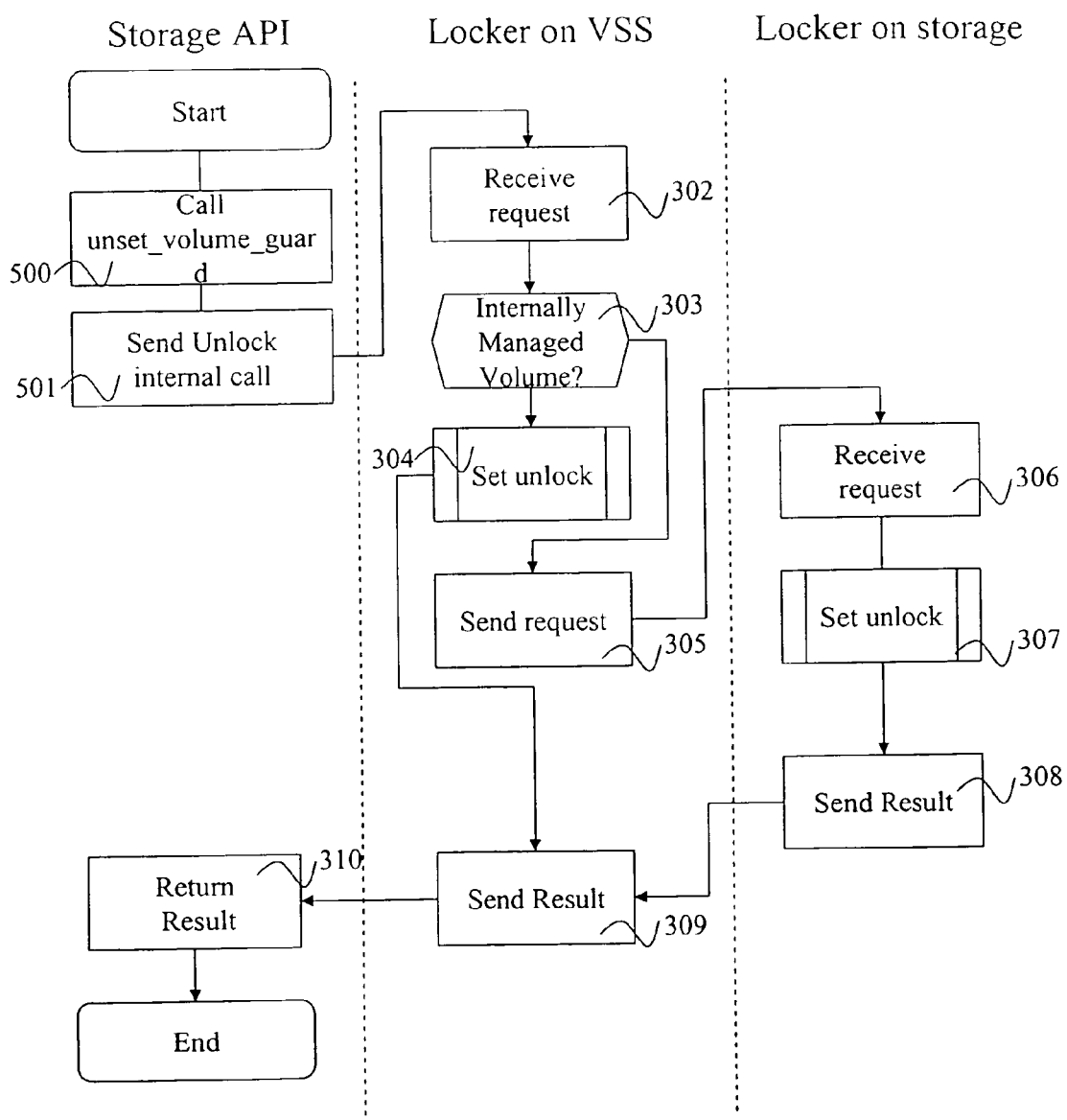
FIG. 8 illustrates a process for modifying the attribute of the target LU according to one embodiment of the present invention.

FIG. 8 illustrates a process for modifying the attribute of the target LU according to one embodiment of the present invention. At step 500, the application calls a storage API "unset_volume_guard." The volume identified is the target LU whose attribute is to be modified. The storage API sends a request to the locker module 39 to unlock the target LU and convert it from READ ONLY to READ-WRITE (step 501)

The locker module receives the request via a suitable communication path (step 502). The controllers checks whether or not the target LU is a volume that is located within the VSS or is a virtual LU that is located in the associated subsystem by examining the internal map table 60 (step 503). If the LU is within the VSS, the locker module modifies the attribute of the target LU to READ-WRITE (step 504) and proceeds to step 509. That is, the LU is unlocked. In the present embodiment, the attribute of the LU cannot be modified or unlocked while the retention period is in effect.

Referring back to step 503, if the target LU is located in the associated subsystem 30, then the controller forwards the request from the storage API to the locker module 49 in the associated subsystem 30 (step 505). The locker module 49 receives the request via a suitable communication path (step 506). The locker unlocks the target LU (step 507). The permission filed 82 of the lock table 80 is changed from READ ONLY to READ-WRITE. The locker module 49 reports this action to the locker module 39 of the VSS (step 508), which in turn reports this to the storage API (step 509). The storage API notifies the application (step 510).

Figure 9:
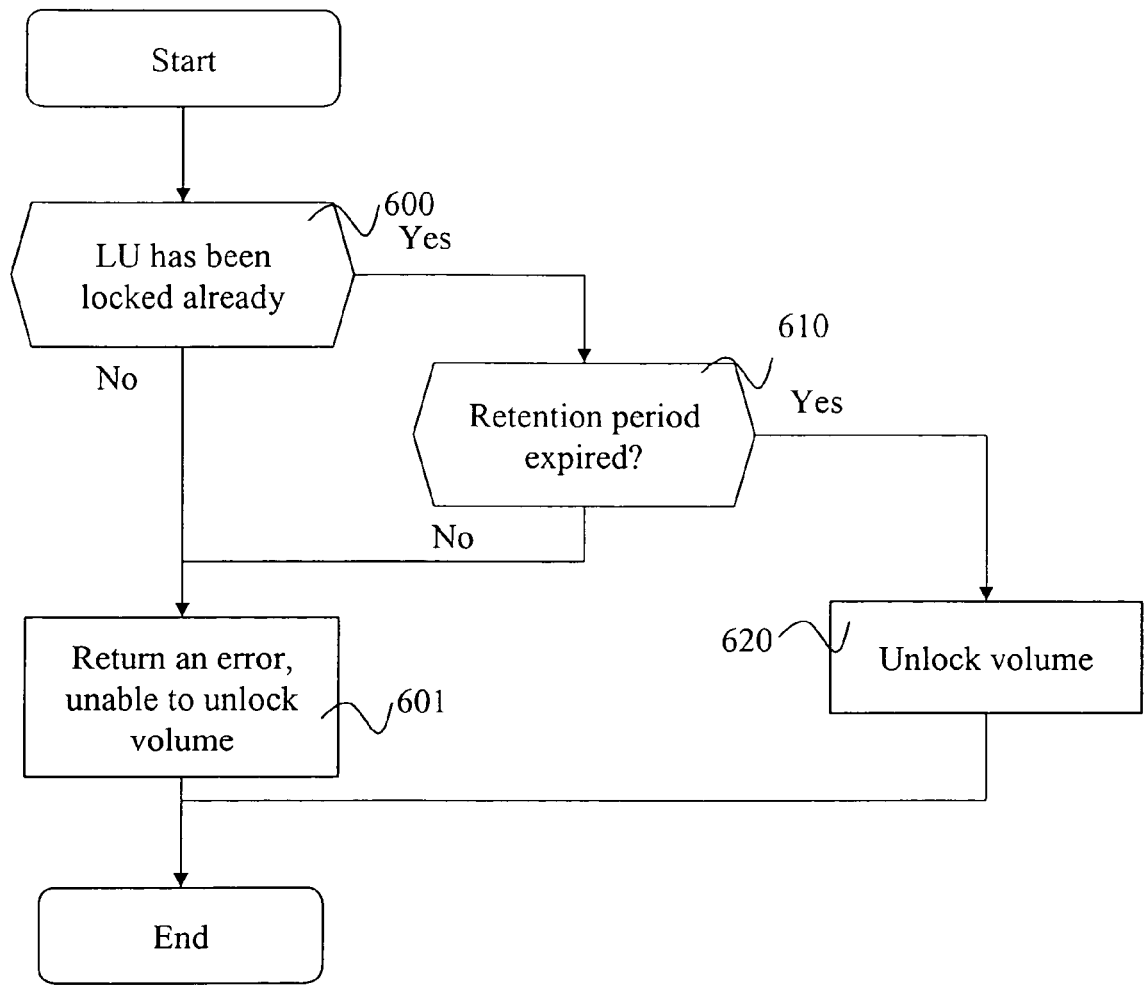
FIG. 9 illustrates a process for unlocking a target LU according to one embodiment of the present invention.

FIG. 9 illustrates a process for unlocking a target LU according to one embodiment of the present invention. The steps 504 and 507 above perform the following. At step 600, the locker module 39 or 49 determines whether or not the target LU has been assigned an attribute, e.g., has been locked or not. If the target LU has not been locked, an error message is returned to the storage API since the LU is already in READ-WRITE mode (step 601).

If the LU has been locked, the locker module accesses the retention field of the lock table to determine whether or not the retention period has expired (step 610). If the retention period has not expired, then an error message is returned to the storage API since the target LU cannot be unlocked until the retention period has expired in the preset embodiment (step 601). If the retention period has expired, the locker module is permitted to unlock the target LU (step 620).

The present invention has been described in terms of specific embodiments. These embodiments are provided for illustrative purposes and may be modified or changed without departing from the scope of the present invention. The scope of the present invention is defined in the appended claims.

What is claimed is:

1. A first storage subsystem to be coupled to an external device, the first storage subsystem comprising:
a first storage volume configured with at least one of first storage devices in the first storage sub system; and
a controller configured to receive I/O requests to the first storage volume and to a second storage volume as a virtual volume, the second storage volume being configured with at least one of second storage devices in a second storage subsystem coupled to the first storage subsystem;
wherein the controller issues a lock request to the second storage subsystem when the controller receives a request from the external device to change an attribute of the second storage volume to write protect state.

2. The first storage subsystem of claim 1, wherein the external device includes a host device.

3. The first storage system of claim 1, further comprising:
a lock table including attribute information for each of the first storage volume and the second storage volume;
wherein the controller is configured to manage the attribute information of the first storage volume and the second storage volume based on the lock table.

4. The first storage system of claim 3, wherein the lock table includes a retention period for at least one of the first storage volume and the second storage volume; and
wherein the attribute assigned to the at least one of the first storage volume and the second volume cannot be changed within the retention period.

5. A method for managing a storage system, comprising:
presenting a plurality of storage volumes to a host via a first storage subsystem, the plurality of storage volumes including a first storage volume that maps to a storage area within the first storage subsystem and a second storage volume that maps to a storage area within a second storage subsystem that is different from the first storage subsystem;
receiving at the first storage subsystem a first request from the host to modify an attribute of a target storage volume, the target storage volume being one of the plurality of storage volumes presented to the host; and
sending a second request from the first storage subsystem to the second storage subsystem if the target volume is determined to be the second storage volume, the second request being a request to modify the attribute of the target volume.

6. The method of claim 5, further comprising:
modifying the attribute of the target volume by a controller of the second storage subsystem according to the second request.

7. The method of claim 6, further comprising:
sending a first report of the attribute modification from the second storage subsystem to the first storage subsystem; and
sending a second report of the attribute modification from the first storage subsystem to the host.

8. The method of claim 5, further comprising:
modifying the attribute of the target volume by a controller of the first storage subsystem if the target volume is the first storage volume.

9. The method of claim 8, wherein the first storage subsystem includes a first locker module to process the first request from the host, and the second storage subsystem includes a second locker module to process the second request from the first storage subsystem.

10. The method of claim 5, wherein the first request is a request to lock the target volume to grant only read access to the target volume.

11. The method of claim 10, wherein the second request is a request to lock the target volume to grant only read access to the target volume.

12. The method of claim 10, wherein a lock table associated with the target volume is updated once the attribute of the target volume has been modified.

13. The method of claim 12, wherein the lock table includes an attribute field and a retention period field.

14. The method of claim 13, wherein the attribute of the target volume cannot be modified if a retention period associated with the retention field for the target volume is not expired.

15. The method of claim 5, wherein the first and second storage subsystems are disk array units.

16. A computer readable medium including a computer program for managing a storage subsystem, the computer program comprising:
code for presenting a plurality of storage volumes to a host via a first storage subsystem, the plurality of storage volumes including a first storage volume that maps to a storage area within the first storage subsystem and a second storage volume that maps to a storage area within a second storage subsystem that is different from the first storage subsystem;
code for receiving at the first storage subsystem a first request from the host to modify an attribute of a target storage volume, the target storage volume being one of the plurality of storage volumes presented to the host; and code for sending a second request from the first storage subsystem to the second storage subsystem if the target volume is determined to be the second storage volume, the second request being a request to modify the attribute of the target volume.

17. The computer program of claim 16, wherein the computer readable medium is provided in a storage subsystem.

18. A first storage subsystem coupled to a second storage subsystem, which stores data written by a host device, the second storage subsystem presenting at least one storage volume as a storage resource to the first storage subsystem, the first storage subsystem presenting at least one virtual volume as a storage resource to the host device, the first storage subsystem comprising:

a first storage volume configured with at least one of first storage devices in the first storage subsystem; and a controller being configured to manage the first storage volume and to manage a second storage volume configured with at least one of second storage devices in the second storage subsystem as the at least one virtual volume;

wherein the controller issues a lock request to the second storage subsystem when the controller receives a request from the host device to change an attribute of the second storage volume to write protect state.

19. The first storage system of claim 18, further comprising:

a lock table including attribute information for each of the first storage volume and the second storage volume;

wherein the controller is configured to manage the attribute information of the first storage volume and the second storage volume based on the lock table.

20. The first storage system of claim 19, wherein the lock table includes a retention period for at least one of the first storage volume and the second storage volume; and wherein the attribute assigned to the at least one of the first storage volume and the second volume cannot be changed within the retention period.

* * * * *